United States Patent
Lu et al.

(10) Patent No.: US 8,594,201 B2
(45) Date of Patent: *Nov. 26, 2013

(54) SYSTEMS AND METHODS FOR VISUAL SIGNAL EXTRAPOLATION OR INTERPOLATION

(75) Inventors: Ligang Lu, New City, NY (US); Vadim Sheinin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,264

(22) Filed: Mar. 11, 2011

(65) Prior Publication Data
US 2011/0164682 A1    Jul. 7, 2011

Related U.S. Application Data

(63) Continuation of application No. 11/327,072, filed on Jan. 6, 2006, now Pat. No. 7,965,774.

(51) Int. Cl.
*H04N 7/12* (2006.01)
(52) U.S. Cl.
USPC ............... 375/240.16; 375/240; 375/240.03; 375/240.27
(58) Field of Classification Search
USPC ............... 375/240.06, 240.16, 240.22, 240
See application file for complete search history.

(56) References Cited

U.S. PATENT DOCUMENTS

| 5,089,887 A | * | 2/1992 | Robert et al. | 348/699 |
| 5,535,288 A | | 7/1996 | Chen et al. | |
| 5,694,487 A | * | 12/1997 | Lee | 382/201 |
| 5,815,602 A | * | 9/1998 | Ueda et al. | 382/236 |
| 5,949,919 A | | 9/1999 | Chen | |
| 6,058,143 A | | 5/2000 | Golin | |
| 6,285,715 B1 | | 9/2001 | Ozcelik | |
| 6,375,567 B1 | | 4/2002 | Acres | |
| 6,449,312 B1 | * | 9/2002 | Zhang et al. | 375/240.16 |

(Continued)

FOREIGN PATENT DOCUMENTS

| JP | 10134193 | 5/1998 |
| JP | 2003309822 | 8/2012 |

OTHER PUBLICATIONS

Aaron et al., Toward Practical Wyner-Ziv Coding of Video, Proc. IEEE Int. Conf on Image Processing, pp. 869-872, Barcelona, Spain, Spet. (2003).

(Continued)

*Primary Examiner* — Qutbuddin Ghulamali
(74) *Attorney, Agent, or Firm* — Scully, Scott, Murphy & Presser, P.C.; Daniel P. Morris, Esq.

(57) ABSTRACT

The present invention relates to computer-based systems and methods for visual signal extrapolation or interpolation based on statistic similarity estimation. Specifically, a first and a second reference pictures are provided, and motion estimation is conducted on the first and second reference pictures to generate motion vectors indicative of movement of at least one of the first and second reference pictures in relation to the other. Subsequently, an estimate picture is generated by extrapolation or interpolation from the first and/or the second reference picture using the motion vectors, followed by optional refinement of the estimate picture. Statistic similarity estimation is used either in motion estimation or in refining the estimate picture, or a combination of both, so as to provide improved visual signals.

8 Claims, 8 Drawing Sheets

(56) References Cited

U.S. PATENT DOCUMENTS

| | | | |
|---|---|---|---|
| 6,760,478 B1 | 7/2004 | Adiletta et al. | |
| 2007/0268964 A1* | 11/2007 | Zhao | 375/240.1 |
| 2008/0075171 A1* | 3/2008 | Suzuki | 375/240.16 |
| 2009/0125912 A1 | 5/2009 | Haghighi | |
| 2009/0168884 A1 | 7/2009 | Lu et al. | |
| 2010/0020886 A1 | 1/2010 | Raveendran et al. | |

OTHER PUBLICATIONS

Puri et al., PRISM: A NewRobust Video Coding Architecture based on Distributed Compression Principles, Allerton Conference on Communication, Control and Computing, (2002);.

Yaman et al., A Low-Complexity Video Encoder with Decoder Motion Estimator, Proc. ICASSP, Montreal, Canada, (2004).

Peng et al., Block-Based Temporal Error Concealment for Video Packet Using Motion Vector Extrapolation, International Conf on Communications, Circuits, Systems and West Sino Expo, pp. 10-14, Jun. 29-Jul. 1, 2002.

Koto et al., Adaptive Bi-Predictive Video Coding Temporal Extrapolation, ICIP (2003).

English-language abstract of Japanese Patent Application No. JP 10134193.

English-language abstract of Japanese Patent Application No. JP 2003309822.

English-language abstract of Japanese Patent Application No. JP11086003.

Chao et al., "Motion-Compensation Spatio-Temporal Interpolation for Frame Rate Up-Conversion of Interlaced or Progressive Image Sequence", Proceedings of the SPIE, Visual Communications and Image Processing, Sep. 28, 1994, pp. 682-693.

Yaman et al., A Low-Complexity Video Encoder with Decoder Motion Estimator, Proc. ICASSP'04, US, IEEE, May 17, 2004, V3, pp. III157-III160.

\* cited by examiner

SYSTEMS AND METHODS FOR VISUAL SIGNAL EXTRAPOLATION OR INTERPOLATION

RELATED APPLICATIONS

This application is a continuation application of U.S. application Ser. No. 11/327,072, filed Jan. 6, 2006.

FIELD OF THE INVENTION

The present invention relates generally to systems and methods for visual signal extrapolation or interpolation. More specifically, the present invention employs statistic similarity estimation for improved visual signal extrapolation or interpolation.

BACKGROUND OF THE INVENTION

Extrapolation and interpolation of a visual signal, such as image, video, and graphics, have been widely used in various contexts, including, but not limited to: video-coding, transcoding, error concealment, pre-processing, and interactive rendering.

For instance, techniques for extrapolating and interpolating in video-coding applications have been described by Aaron et al., *Toward Practical Wyner-Ziv Coding of Video*, PROC. IEEE INT. CONF ON IMAGE PROCESSING, pp. 869-872, Barcelona, Spain, Spet. (2003), Puri et al., *PRISM: A New Robust Video Coding Architecture based on Distributed Compression Principles*, ALLERTON CONFERENCE ON COMMUNICATION, CONTROL AND COMPUTING, (2002), and Yaman et al., *A Low-Complexity Video Encoder with Decoder Motion Estimation*, Proc. ICASSP, Montreal, Canada, (2004). Techniques for extrapolating and interpolating in transcoding applications have been described by U.S. Pat. No. 6,058,143 issued on May 2, 2000 to Golin for "Motion Vector Extrapolation for Transcoding Video Sequences." Further, techniques for extrapolating and interpolating in error concealment for video decoding or post-processing applications have been described by Peng et al., *Block-Based Temporal Error Concealment for Video Packet Using Motion Vector Extrapolation*, International Conf on Communications, Circuits, Systems and West Sino Expo, pp. 10-14, Jun. 29-Jul. 1, 2002 and by U.S. Pat. No. 6,285,715 issued on Sep. 4, 2001 to Ozcelik for "Methods and Apparatus for Error Concealment While Decoding a Coded Video Bit Stream." The visual signal extrapolation and interpolation methods used in video coding, transcoding, error concealment, video decoding, and post-processing applications are typically based on motion information and are therefore referred to as motion-based extrapolation and interpolation methods, respectively.

Non-motion-based extrapolation/interpolation methods, which are typically used in other applications, include the model-based view extrapolation method used for virtual reality rendering, the feature extrapolation method used for pre-compression, and the video fading scene prediction method. For example, the model-based view extrapolation method is described by U.S. Pat. No. 6,375,567 issued on Apr. 23, 2002 to Acres for "Model-Based View Extrapolation for Interactive Virtual Reality Systems." The feature extrapolation method is described by U.S. Pat. No. 5,949,919 issued on Sep. 7, 1999 to Chen for "Precompression Extrapolation Method." The video fading scene prediction is described by Koto et al., *Adaptive Bi-Predictive Video Coding Temporal Extrapolation*, ICIP (2003).

One example of the motion-based extrapolation/interpolation methods is the Wyner-Ziv video coding technique. A typical Wyner-Ziv video coding system includes a video encoder and a video decoder. The video encoder is a low complexity and low power encoder, so the computation-heavy signal processing tasks, such as the motion estimation, are carried by the decoder instead. To achieve high efficiency, the Wyner-Ziv decoder needs to exploit the correlation between the source and side information, which is only known to the decoder, in order to decode the received video signals and reconstruct the video. The source information is the video signal (e.g., a picture) to be encoded at the encoder and transmitted to the decoder for decoding, and the side information is essentially an estimate of the picture to be decoded. Since the performance of the Wyner-Ziv system depends heavily on the reliability of the side information, the mechanism used by the decoder for generating the side information plays a very crucial role in the Wyner-Ziv video coding system. Typically, the decoder first performs motion estimation on previously reconstructed pictures to generate a set of motion vectors and then uses such motion vectors to generate an estimate of the picture currently being decoded by extrapolation or interpolation. This estimate is used as the side information by the decoder for decoding and reconstructing the current picture.

FIG. 1 is a diagram illustrating a motion-based temporal extrapolation process well known in the art. Specifically, in order to extrapolate a current Picture N, motion estimation is first performed on at least two previously reconstructed pictures, namely, Pictures N−2 and N−1, to generate a set of motion vectors for each pixel or a block of pixels in Picture N−1, which are indicative of the motion of the pixel or the block of pixels between Picture N−1 and Picture N−2 (i.e., a "reverse" motion). Then, the motion vectors are manipulated according to a predetermined function that is established upon an underlying motion model or assumption. For example, if a constant linear displacement motion model is assumed, the motion vectors are reversed, and the pixel or the block of pixels associated with the motion vectors is extrapolated (i.e., mapped) from its location in Picture N−1 to a location defined by the reversed motion vectors in an estimate of the current Picture N, as shown in FIG. 1. Note that the motion vectors can also be constructed for each pixel or a block of pixels in Picture N−2 to indicate the motion between Picture N−2 and Picture N−1. In such an incident, the motion vectors should then be shifted, and the pixel or the block of pixels associated with the motion vectors should be extrapolated or mapped from its location in Picture N−1 to a location defined by the scaled motion vectors in an estimate of the current Picture N. The motion-based temporal extrapolation process as described hereinabove therefore creates an estimate of the current Picture N, after all the pixels or the blocks of pixels in Picture N−1 (or Picture N−2) are mapped.

FIG. 2 further illustrates a well-known motion-based temporal interpolation process. Motion estimation is first performed on at least two previously reconstructed pictures, namely, Pictures N−1 and N+1, to obtain a set of motion vectors for each pixel or a block of pixels in Picture N−1, which are indicative of the motion of the pixel or the block of pixels from Picture N−1 to Picture N+1. Then, the motion vectors are scaled down (e.g., by a factor of 2) based on an underlying assumption for a constant linear displacement motion model, and the pixels or the blocks of pixels associated with the motion vectors are interpolated from their locations in Picture N−1 and/or N+1 to a location defined by the scaled motion vectors in an estimate of the current Picture N, as shown in FIG. 2. Note that the motion vectors can also be constructed for each pixel or a block of pixels in Picture N+1 to indicate the motion between Picture N+1 and Picture N−1. In such an incident, the motion vectors should also be scaled down (e.g., by a factor of 2), and the pixels or the blocks of pixels associated with the motion vectors should be interpolated from their locations in Picture N−1 and/or Picture N+1 to a location defined by the scaled motion vectors in an estimate of the current Picture N. The motion-based temporal interpolation process as described hereinabove also creates an estimate of the current Picture N, after all the pixels or the blocks of pixels in Picture N+1 (or Picture N−1) are mapped.

FIG. 3 is a flowchart that describes the processing steps used for achieving the well known motion-based extrapolation and interpolation. Specifically, motion estimation is first performed on picture signals obtained from previously reconstructed pictures to generate a set of motion vectors. The motion vectors are then manipulated, according to an underlying motion model or assumption, to generate an estimate of the picture to be decoded by either extrapolation or interpolation, depending on the temporal relationship between the picture to be decoded and the previously reconstructed pictures.

The above-described conventional motion-based extrapolation and interpolation methods have several serious drawbacks, including:

1. The underlying assumption that the objects follow a constant motion model (usually a constant linear displacement model) from picture to picture often does not hold true for real visual signals; and
2. The extrapolation or interpolation may not result in a one-to-one mapping between the previously reconstructed picture(s) and the estimate picture. Some pixel positions in the extrapolated or interpolated picture (i.e., the estimate) may not get any mapping from the previously reconstructed picture(s), i.e., leaving empty holes, while other pixel positions in the extrapolated or interpolated picture may have multiple mappings from the previously reconstructed picture(s), i.e., leaving superimposed spots.

It is therefore desirable to provide an improved system and method for visual signal extrapolation and interpolation, without the drawbacks of the conventional motion-based extrapolation and interpolation methods.

SUMMARY OF THE INVENTION

The present invention is directed to a computer-based method for visual signal extrapolation or interpolation, comprising:

providing at least a first and a second reference pictures;

conducting motion estimation on the first and second reference pictures to generate motion vectors indicative of movement of at least one of the first and second reference pictures in relation to the other;

generating an estimate picture by extrapolation or interpolation from the first and/or the second reference picture using the motion vectors; and refining the estimate picture, wherein statistic similarity estimation is used either in motion estimation or in refining the estimate picture, or a combination of both.

The reference pictures as used in the present invention are previously reconstructed pictures that can be used for constructing the estimate picture via extrapolation or interpolation.

When the statistic similarity estimation is used for motion estimation, statistic features of a block of pixels on the first reference picture are calculated and compared with statistic features of one or more blocks of pixels on the second reference picture. The best matching block of pixels on the second reference picture is then determined, at least partially based on its statistic similarity to the block of pixels on the first reference picture, and motion vectors are generated for the block of pixels on the first reference picture indicative of its movement in relation to the best matching block of pixels on the second reference picture.

When the statistic similarity estimation is used for refining the estimate picture, it can be used for filling empty pixel positions on the estimate picture or for resolving multiple mappings to the same pixel position on the estimate picture.

Preferably, but not necessarily, the following steps are taken to fill an empty pixel position on the estimate picture:

calculating statistic features for a neighboring block that surrounds the empty pixel position on the estimate picture;

identifying a search area on the reference picture from which the estimate picture is generated;

searching for the best matching block within the search area, wherein the best matching block surrounds a specific pixel on the reference picture and has the highest statistic similarity to the neighboring block that surrounds the empty pixel position on the estimate picture; and filling the empty pixel position with the specific pixel surrounded by the best matching block on the reference picture.

In the event of multiple mappings, i.e., there exist multiple pixels on the reference picture from which the estimate picture is generated, all of which extrapolate or interpolate to a specific pixel position on the estimate picture, the following steps are preferably, but not necessarily, taken to select the best matching pixel for the specific pixel position on the estimate picture:

calculating statistic features for a neighboring block that surrounds the specific pixel position on the estimate picture;

calculating statistic features for multiple blocks of pixels that each surrounds one of the multiple pixels on the reference picture;

identifying the best matching block among the multiple blocks surrounding the multiple pixels on the reference picture, wherein the best matching block has the highest statistic similarity to the neighboring block that surrounds the specific pixel position on the estimate picture; and selecting the pixel that is surrounded by the best matching block on the reference picture as the best matching pixel for the specific pixel position on the estimate picture.

The statistic features that can be used in the present invention include, but are not limited to: block sample mean, block sample variance, neighboring parameters, etc.

In a preferred but not necessary embodiment of the present invention, the statistic similarity between two blocks of pixels is determined by calculating a statistic similarity index according to the following formula:

$$SSI(P,Q) = \frac{\alpha}{\sqrt{[\mathrm{Cov}(P,Q)^2 - \mathrm{Var}(P) \times \mathrm{Var}(Q)]^2 + \beta[\mu(P) - \mu(Q)]^2}},$$

wherein P is one block of pixels, Q is another block of pixels, SSI(P, Q) is the statistic similarity index indicative of the statistic similarity between blocks P and Q, $\mu(P)$ is the block sample mean of the block P, $\mu(Q)$ is the block sample mean of the block Q, Var(P) is the block sample variance of the block P, Var(Q) is the block sample variance of the block Q, Cov(P, Q) is the covariance between blocks P and Q, and $\alpha$ and $\beta$ are weighting factors.

The above-described statistic similarity index can be used for motion estimation, for filling an empty pixel on the estimate picture, and/or for resolving the multiple mapping problem.

Another aspect of the present invention relates to a computer-based system for visual signal extrapolation or interpolation, comprising:

means for obtaining and storing at least a first and a second reference pictures;

means for conducting motion estimation on the first and second reference pictures to generate motion vectors indicative of movement of at least one of the first and second reference pictures in relation to the other;

means for generating an estimate picture by extrapolation or interpolation from the first or the second reference picture using the motion vectors; and means for refining the estimate picture, wherein statistic similarity estimation is used in either motion estimation or in refining the estimate picture, or a combination of both.

Other aspects, features and advantages of the invention will be more fully apparent from the ensuing disclosure and appended claims.

DETAILED DESCRIPTION OF THE INVENTION AND PREFERRED EMBODIMENTS THEREOF

The present invention provides improved methods and systems for extrapolation and interpolation by using statistic similarity estimation.

Figure 1:
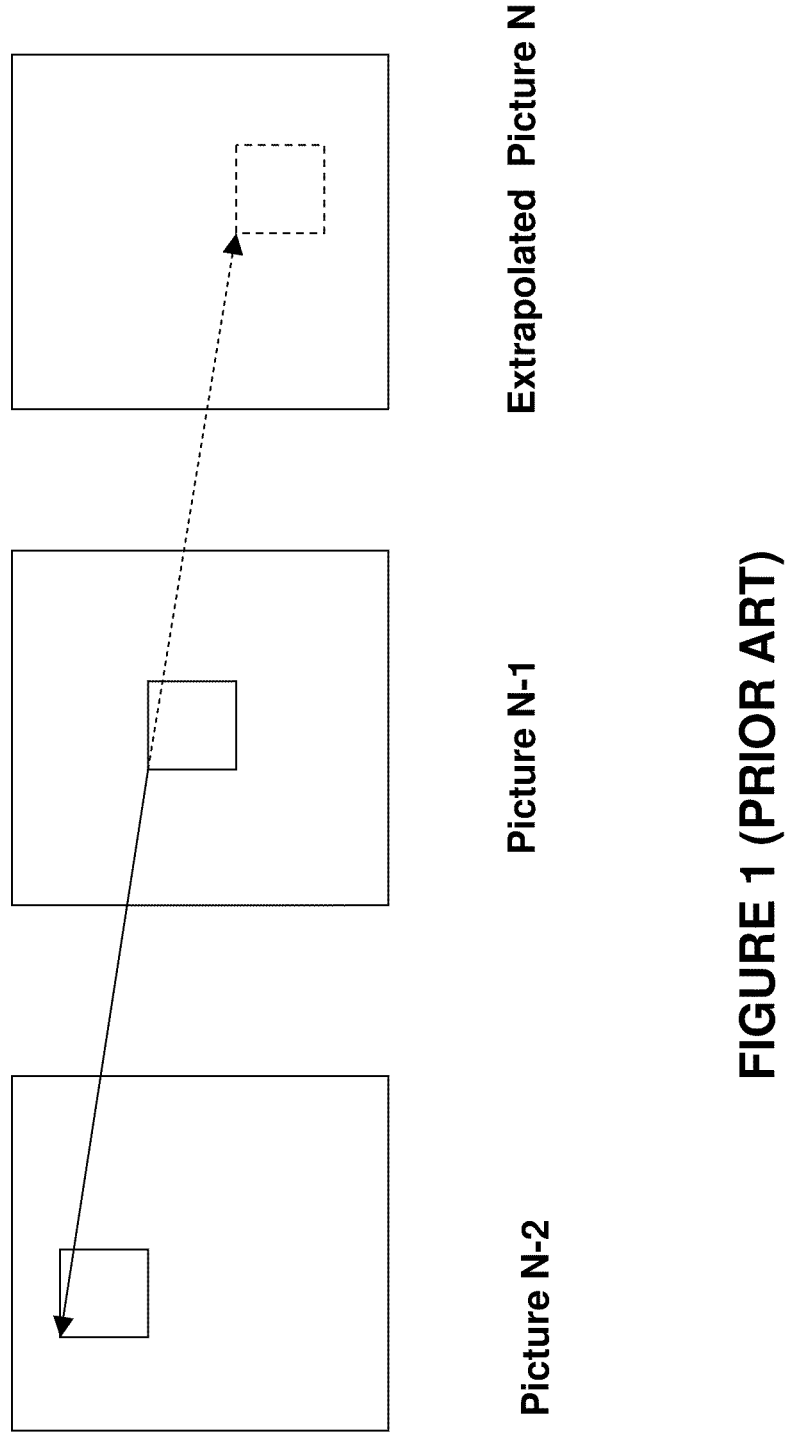
FIG. 1 is a diagram illustrating a conventional motion-based temporal extrapolation method.
Figure 2:
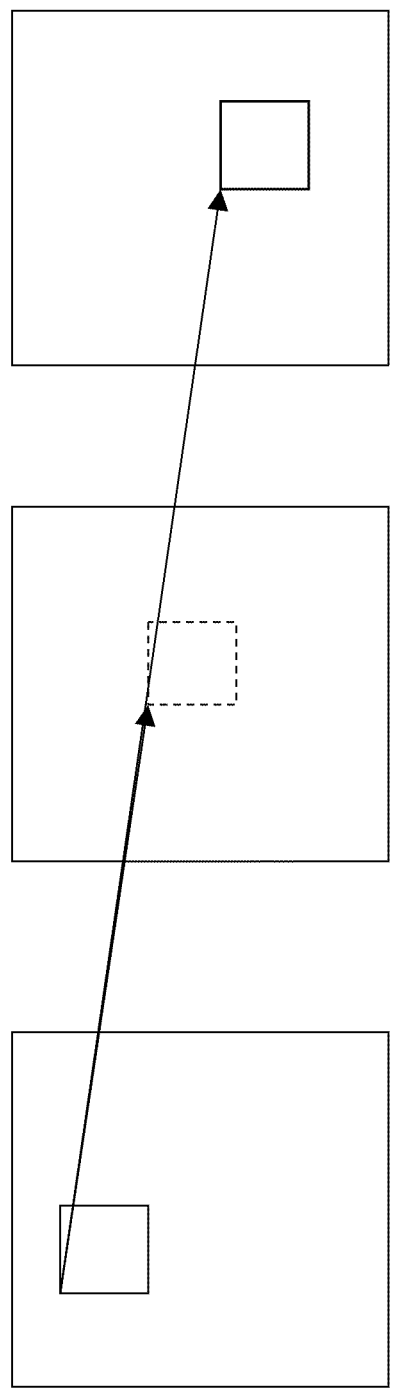
FIG. 2 is a diagram illustrating a conventional motion-based temporal interpolation method.
Figure 3:
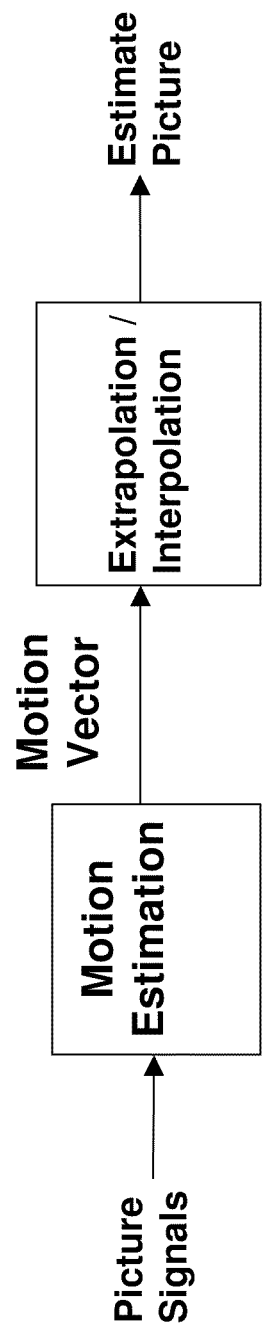
FIG. 3 is a flowchart describing the processing steps used in the conventional motion-based extrapolation and interpolation methods.
Figure 4:
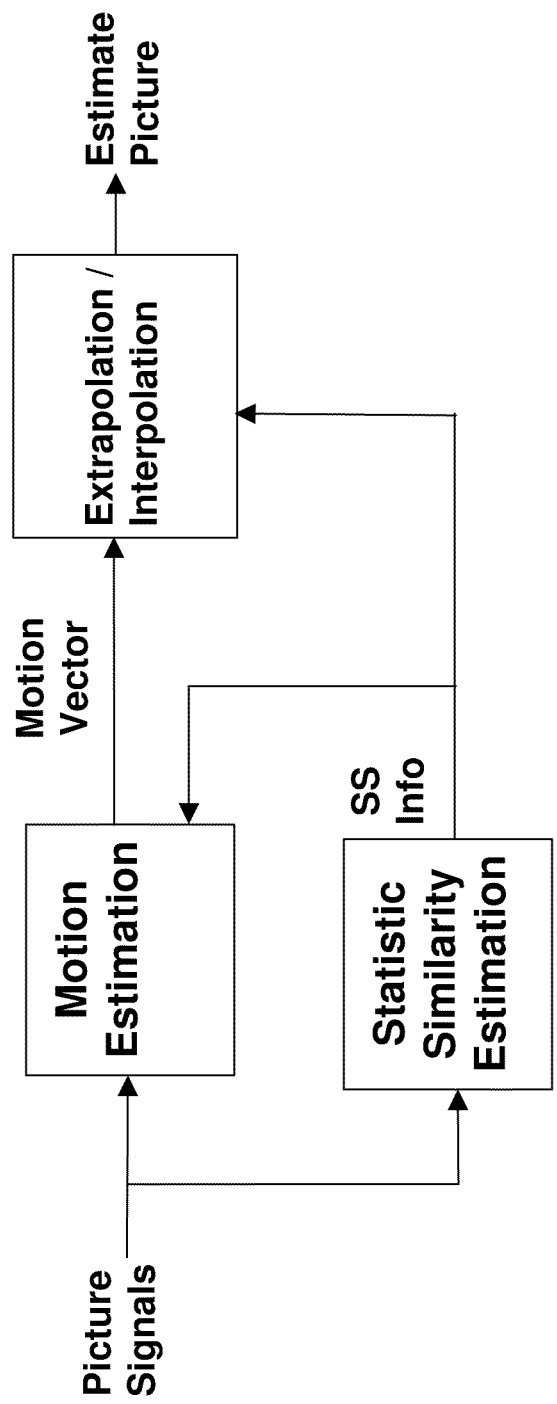
FIG. 4 is a flowchart describing an improved visual signal extrapolation or interpolation system and method by using statistic similarity estimation, according to one embodiment of the invention.

Specifically, motion estimation is first performed on picture signals obtained from previously reconstructed pictures, i.e., reference pictures, to generate a set of motion vectors, which are then used to generate an estimate picture by either extrapolation or interpolation from one of the reference pictures, while statistic similarity estimation is used either for conducting the motion estimation or for refining the estimate picture, or a combination of both, as illustrated by FIG. 4. More specifically, the statistic similarity estimation is conducted by comparing the statistics features of two or more pixel blocks, including, but not limited to: the block sample mean, the block sample variance, the neighboring parameters such as the homogeneity of the neighborhood surrounding the block, and the covariance between the two or more pixel blocks.

Figure 5:
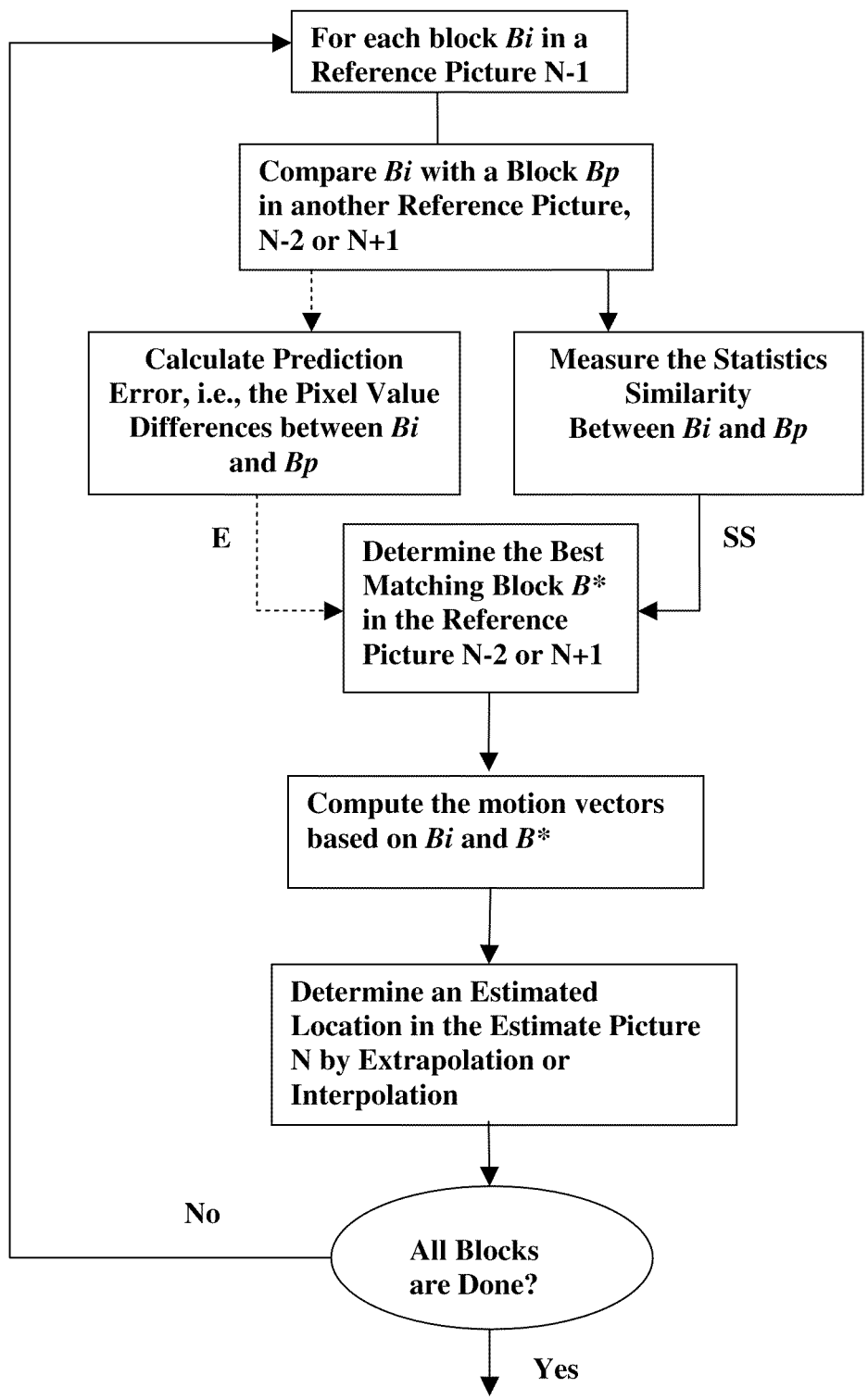
FIG. 5 is a flowchart that illustrates exemplary processing steps that use statistic similarity measurements in motion estimation to generate motion vectors for constructing an estimate picture by extrapolation or interpolation, according to one embodiment of the present invention.

FIG. 5 illustrates the exemplary processing steps that use statistic similarity estimation in motion estimation to generate motion vectors for constructing an estimate picture by extrapolation or interpolation, according to one embodiment of the present invention.

First, at least two previously decoded and reconstructed pictures, which are referred to hereinafter as the reference pictures, are obtained and stored by the decoder. These two reference pictures are referred to as N−1 and N−2 for extrapolation-based estimation (or as N−1 and N+1 for interpolation-based estimation).

For each block of pixels in the reference picture N−1, a search process is performed to find its best match in the other reference picture N−2 (or N+1). In order to find the best matching block B* in the reference picture N−2 (or N+1) for a specific block Bi in the reference picture N−1, the search process picks a same size block of pixels, Bp, from the reference picture N−2 (or N+1) and computes a statistic similarity index SSI, which is indicative of the statistic similarities between Bi and Bp, and optionally a prediction error E, which is the differences in pixel values between Bi and Bp. The statistic similarity index SSI and the prediction error E can be combined to determine the best matching block B* in the reference picture N−2 (or N+1), as shown in FIG. 5. Alternatively, the best matching block B* in the reference picture N−2 (or N+1) can be selected based only on the statistic similarity index SSI.

Once the best matching block B* in the reference picture N−2 (or N+1) is determined, a set of motion vectors can be generated for the block Bi in the reference picture N−1, which are indicative of the movement of block Bi in relation to B*. The motion vectors can be generated from various parameters associated with blocks Bi and B*. Preferably, but not necessarily, they are generated by taking the spatial differences (i.e., the horizontal and vertical coordinates) of blocks Bi and B*. The motion vectors are then manipulated (e.g., reversed, scaled, shifted, or otherwise altered) for extrapolating or interpolating a location in the picture to be decoded and reconstructed, which is referred to hereinafter as the estimate picture N, where the estimate of the block Bi resides. The pixel values of the estimate block are derived from the pixel values of blocks Bi and B*, for example, by averaging the pixel values of these blocks or by otherwise manipulating such pixel values.

The above-described processing steps are repeated for each block of pixels in the reference picture N−1, so that the estimate of each block of pixels in the reference picture N−1 is mapped, thereby forming a complete estimate picture N.

Figure 6:
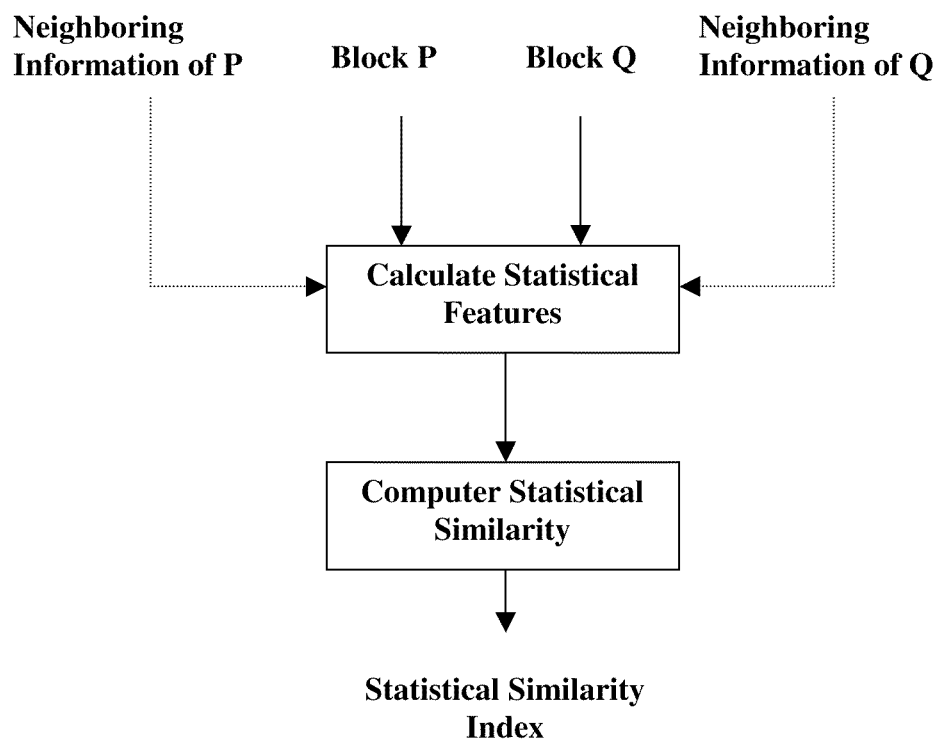
FIG. 6 is a flowchart that illustrates exemplary processing steps for calculating a statistical similarity index for two blocks of pixels P and Q, according to one embodiment of the present invention.

FIG. 6 further describes the exemplary processing steps for determining the statistical similarity between two blocks of pixels P and Q. First, information directly relating to blocks P and Q is obtained, which include, but are not limited to: pixel values, luminance, contrast, structure, etc. Preferably, but not necessarily, information relating to the neighborhoods where blocks P and Q reside (i.e., the neighboring information) is also obtained.

Various statistic features for blocks P and Q are then calculated based on the information directly relating to blocks P and Q and optionally the neighboring information, which are then compared to determine the statistic similarity between blocks P and Q. For example, statistic features such as block sample mean, block sample variance, neighboring parameters, as well as the covariance between blocks P and Q can be used for determining the statistic similarity. Other well-known statistic features can also be used.

More specifically, assuming that the blocks P and Q are both characterized by a block size n×m, the pixel values in block P can be referred to as $P_{ij}$, and the pixel values in block Q can be referred to as $Q_{ij}$, wherein i=1, 2, . . . , n, and j=1, 2, . . . , m. The block sample mean for P is defined as $$\mu(P) = \frac{1}{nm} \sum_{j=1}^{n} \sum_{i=1}^{m} P_{ij},$$

and the block sample mean for Q is defined as $$\mu(Q) = \frac{1}{nm} \sum_{j=1}^{n} \sum_{i=1}^{m} Q_{ij}.$$

The block sample variance for P is defined as $$\text{Var}(P) = \frac{1}{mn-1} \sum_{j=1}^{n} \sum_{i=1}^{m} (P_{ij} - \mu_P)^2,$$

and the block sample variance for P is defined as $$\text{Var}(Q) = \frac{1}{mn-1} \sum_{j=1}^{n} \sum_{i=1}^{m} (Q_{ij} - \mu_Q)^2.$$

The covariance of blocks P and Q is estimated as $$\text{Cov}(P, Q) = \frac{1}{mn-1} \sum_{j=1}^{n} \sum_{i=1}^{m} (P_{ij} - \mu_P)(Q_{ij} - \mu_Q).$$

Moreover, neighboring parameters of blocks P and Q, such as the homogeneity of the neighborhoods surrounding blocks P and Q, can also be used for determining the statistic similarity between blocks P and Q. The neighborhood homogeneity can be determined based on, for example, the differences between the motion vectors of the block P or Q and the motion vectors of one or more existing neighboring blocks surrounding the block P or Q.

The statistic features of blocks P and Q provide a good indication on how similar these two blocks are. Preferably, a statistic similarity index is computed based on the statistic features of blocks P and Q to provide a quantitative measurement of the statistic similarity between blocks P and Q, as shown in FIG. 6. The statistical features can be weighted and combined in various manners for computing the statistic similarity index.

In a preferred but not necessary embodiment of the present invention, the statistic similarity index SSI can be computed for blocks P and Q by using the following formula:

$$SSI(P,Q) = \alpha \frac{1}{\sqrt{[\text{Cov}(P,Q)^2 - \text{Var}(P) \times \text{Var}(Q)]^2} + \beta[\mu(P) - \mu(Q)]^2},$$

wherein $\mu(P)$ is the block sample mean of the block P, $\mu(Q)$ is the block sample mean of the block Q, Var(P) is the block sample variance of the block P, Var(Q) is the block sample variance of the block Q, Cov(P, Q) is the covariance between blocks P and Q, and $\alpha$ and $\beta$ are weighting factors, as mentioned hereinabove. The smaller the value of the statistic similarity index, the more similar the two blocks.

More preferably, when statistic similarities of multiple pixel blocks are determined to generate multiple statistic similarity indexes, these indexes are normalized, so that each index value falls between 0 and 1.

As mentioned hereinabove since the extrapolation and interpolation do not generate one-to-one mapping to the estimate picture, there may be pixel positions in the estimate position that do not get any mapping, i.e., leaving empty holes. On the other hand, there may also be pixel positions in the estimate position that get multiple mappings, i.e., leaving superimposed spots. The quality of the estimate picture is adversely affected by existence of the empty holes or superimposed spots.

This invention therefore provides solutions to these problems, by using statistical similarity estimation to refine the estimate picture, i.e., filling in the empty pixel positions and/or resolving the multiple mappings.

Figure 7:
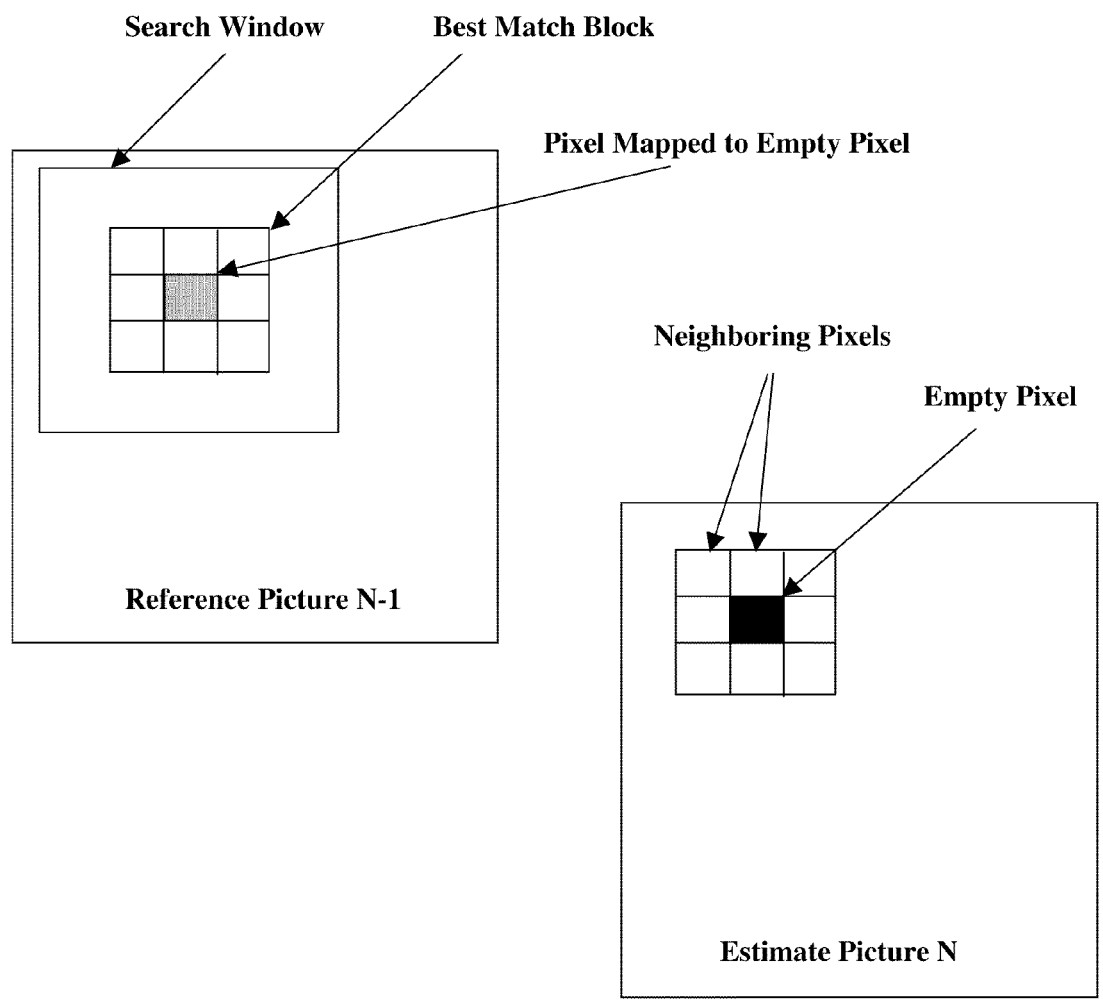
FIG. 7 is a diagram illustrating a method for filling empty pixel position on an estimate picture by using statistic similarity estimation, according to one embodiment of the present invention.

FIG. 7 shows how statistical similarity estimation can be used to fill in an empty pixel position on an estimate picture N.

First, the statistical features of a neighboring block of pixels that surround the empty pixel position on the estimate picture N are calculated. The motion vectors of the pixels in the neighboring block can be used to determine an initial point on the reference picture N−1, from which the estimate picture is generated by extrapolation or interpolation. An appropriate search window surrounding the initial point is then identified. Within this search window, a searching process is performed to find the block that best matches the neighboring block on the estimate picture N. The best matching block is characterized by the highest statistical similarity, and optionally the lowest pixel value difference, with respect to the neighboring block on the estimate picture N. The specific pixel surrounded by this best matching block on the reference picture N−1, as shown in FIG. 7, is then used to fill the empty pixel position in the estimate picture N.

Figure 8:
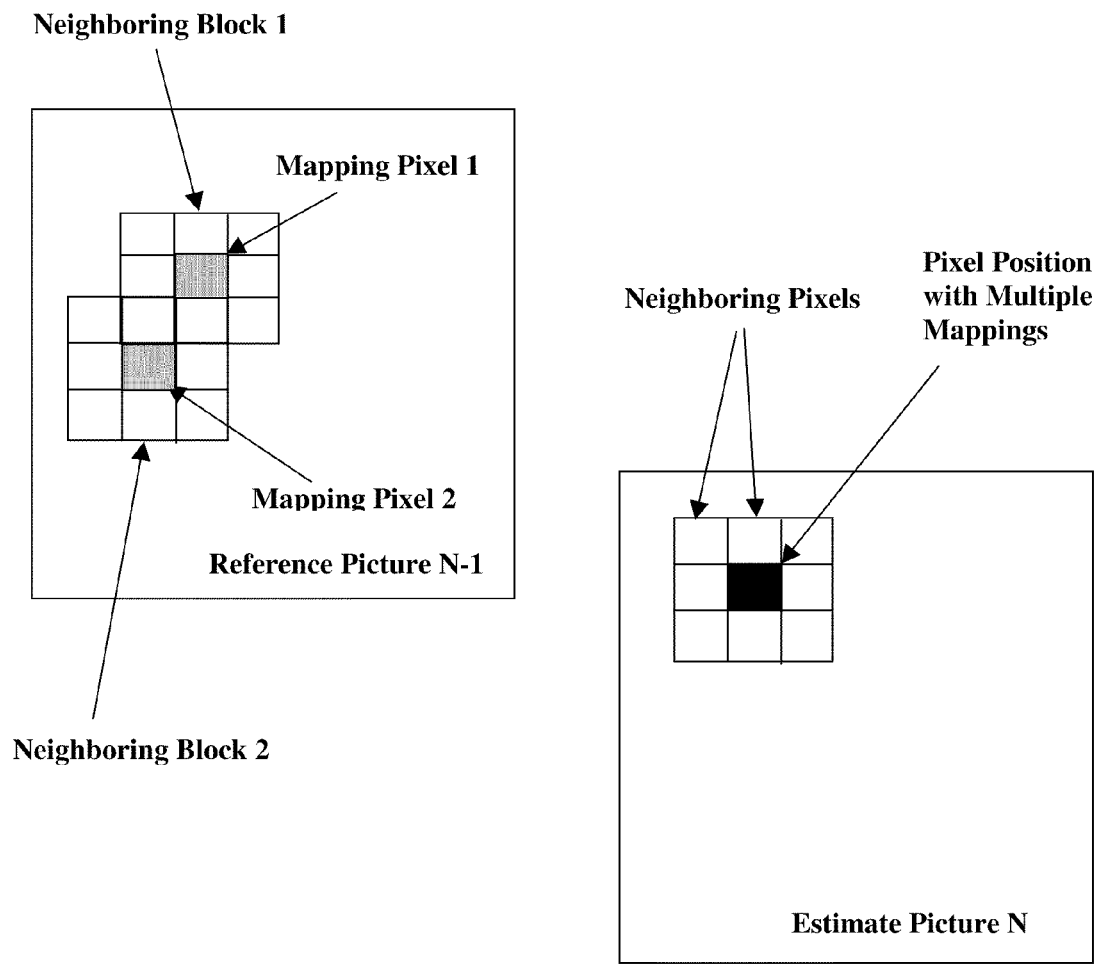
FIG. 8 is a diagram illustrating a method for resolving multiple mappings for a pixel position on an estimate picture by using statistic similarity estimation, according to one embodiment of the present invention.

Further, FIG. 8 shows how statistical similarity estimation can be used to select a best matching pixel for a specific pixel position on the estimate picture N, in the event that multiple pixels on the reference picture N−1 all map to (i.e., by extrapolation or interposition) the same pixel position on the estimate picture N.

First, the statistical features of a neighboring block of pixels that surround the specific pixel position on the estimate picture N are calculated. Next, the statistic features for multiple blocks of pixels that each surrounds one of the multiple pixels on the reference picture N−1 are calculated. Among these multiple blocks on the reference picture N−1, the one that best matches the neighboring block on the estimate picture N is identified. The best matching block, as mentioned hereinabove, is characterized by the highest statistical similarity, and optionally the lowest pixel value difference, with respect to the neighboring block on the estimate picture N. The specific pixel surrounded by this best matching block on the reference picture N−1 is then selected as the best matching pixel for the specific pixel position in the estimate picture N.

Various computational steps as described hereinabove can be readily carried by a computer-based visual signal analyzer, which may comprise a general-purpose computer, a specific-purpose computer, a central processor unit (CPU), a microprocessor, or an integrated circuitry that is arranged and constructed to collect and process visual signal data. Such visual signal analyzer preferably comprises a visual signal extrapolation or interpolation protocol for computationally carrying out the above-described visual signal extrapolation or interpolation methods to generate and refine estimate pictures, according to the present invention. The visual signal extrapolation or interpolation protocol can be embodied in any suitable form, such as software operable in a general-purpose computer, a specific-purpose computer, or a central processor unit (CPU). Alternatively, the protocol may be hard-wired in circuitry of a microelectronic computational module, embodied as firmware, or available on-line as an operational applet at an Internet site for phase analysis.

Although the invention has been variously disclosed herein with reference to illustrative embodiments and features, it will be appreciated that the embodiments and features described hereinabove are not intended to limit the invention, and that other variations, modifications and alternative embodiments will readily suggest themselves to those of ordinary skill in the art. The invention therefore is to be broadly construed, as including such variations, modifications and alternative embodiments, within the spirit and scope of the ensuing claims.

What is claimed is:

1. A computer-based method for visual signal extrapolation or interpolation, comprising:
    providing at least a first and a second reference picture;
    conducting motion estimation on the first and second reference picture to generate motion vectors indicative of movement of at least one of the first and second reference picture in relation to the other; and
    generating an estimate picture by extrapolation or interpolation using the motion vectors; and
    determining an empty pixel position in said estimate picture;
    refining the estimate picture having said empty pixel position,
    wherein a statistic similarity estimation is used in refining the estimate picture by:
    calculating statistic features for a neighboring block of pixels that surrounds the empty pixel position on the estimate picture;
    identifying a search area on said first or second reference picture from which the estimate picture is generated; and
    searching for a best matching block within the search area of multiple blocks having a highest statistic similarity to the neighboring block that surrounds the empty pixel position on the estimate picture, the best matching block surrounding a specific pixel on the first or second reference picture, and a best matching block having said highest statistic similarity to the neighboring block determined according to a statistical similarity index computed by:

$$SSI(P,Q) = \frac{\alpha}{\sqrt{[Cov(P,Q)^2 - Var(P) \times Var(Q)]^2 + \beta[\mu(P) - \mu(Q)]^2}},$$

wherein P is the neighboring block that surrounds the empty pixel position on the estimate picture, Q is a block of pixels within the search area, SSI(P, Q) is the statistic similarity index indicative of the statistic similarity between blocks P and Q, $\mu(P)$ is a block sample mean of the block P, $\mu(Q)$ is a block sample mean of the block Q, Var(P) is a block sample variance of the block P, Var(Q) is a block sample variance of the block Q, Cov(P, Q) is a covariance between blocks P and Q, and $\alpha$ and $\beta$ are weighting factors; and
    filling the empty pixel position with the specific pixel surrounded by the best matching block on the first or second reference picture.

2. The computer-based method of claim 1, wherein statistic similarity estimation is used in said motion estimation.

3. The computer-based method of claim 1, wherein statistic features of a block of pixels on the first reference picture are calculated and compared with statistic features of one or more blocks of pixels on the second reference picture, wherein the best matching block of pixels on the second reference picture is determined at least partially based on its statistic similarity to the block of pixels on the first reference picture, and wherein motion vectors are generated for the block of pixels on the first reference picture indicative of its movement in relation to the best matching block of pixels on the second reference picture.

4. The computer-based method of claim 1, wherein the statistic similarity indexes are normalized.

5. A computer-based method for visual signal extrapolation or interpolation, comprising:
    providing at least a first and a second reference picture;
    conducting motion estimation on the first and second reference picture to generate motion vectors indicative of movement of at least one of the first and second reference picture in relation to the other; and
    generating an estimate picture by extrapolation or interpolation using the motion vectors;
    determining existence of multiple pixel mappings to a specific pixel position in said estimate picture; and
    refining the estimate picture with said specific pixel having said multiple pixel mappings, wherein a statistic similarity estimation is used in said refining by:
    calculating statistic features for a neighboring block that surrounds the specific pixel position on the estimate picture;
    calculating statistic features for multiple blocks of pixels that each surrounds one of the multiple pixels on the reference picture;
    identifying the best matching block among the multiple blocks surrounding the multiple pixels on the reference picture, wherein the best matching block has the highest statistic similarity to the neighboring block that surrounds the specific pixel position on the estimate picture according to a statistical similarity index computed by:

$$SSI(P,Q) = \frac{\alpha}{\sqrt{[Cov(P,Q)^2 - Var(P) \times Var(Q)]^2 + \beta[\mu(P) - \mu(Q)]^2}},$$

wherein P is the neighboring block that surrounds the specific pixel position on the estimate picture, Q is one of the multiple blocks that surround the multiple pixels on the reference picture, SSI(P, Q) is the statistic similarity index indicative of the statistic similarity between blocks P and Q, $\mu(P)$ is a block sample mean of the block P, $\mu(Q)$ is a block sample mean of the block Q, Var(P) is a block sample variance of the block P, Var(Q) is a block sample variance of the block Q, Cov(P, Q) is a covariance between blocks P and Q, and $\alpha$ and $\beta$ are weighting factors; and
    selecting the pixel that is surrounded by the best matching block on the reference picture as the best matching pixel for the specific pixel position on the estimate picture.

6. The computer-based method of claim 5, wherein statistic similarity estimation is used both in motion estimation and in refining the estimate picture.

7. A computer-based system for visual signal extrapolation or interpolation, comprising:
   means for obtaining and storing at least a first and a second reference picture;
   means for conducting motion estimation on the first and second reference picture to generate motion vectors indicative of movement of at least one of the first and second reference picture in relation to the other;
   means for generating an estimate picture by extrapolation or interpolation from the first or the second reference picture using the motion vectors;
   means for determining an empty pixel position in said estimate picture;
   means for refining the estimate picture having said empty pixel position,
   said refining means configured to perform a statistic similarity estimation in refining the estimate picture by:
   calculating statistic features for a neighboring block of pixels that surrounds the empty pixel position on the estimate picture;
   identifying a search area on said first or second reference picture from which the estimate picture is generated; and
   searching for a best matching block within the search area of multiple blocks having a highest statistic similarity to the neighboring block that surrounds the empty pixel position on the estimate picture, the best matching block surrounding a specific pixel on the first or second reference picture, and a best matching block having said highest statistic similarity to the neighboring block determined according to a statistical similarity index computed by:

$$SSI(P,Q) = \frac{\alpha}{\sqrt{[Cov(P,Q)^2 - Var(P) \times Var(Q)]^2 + \beta[\mu(P) - \mu(Q)]^2}},$$

wherein P is the neighboring block that surrounds the empty pixel position on the estimate picture, Q is a block of pixels within the search area, SSI(P, Q) is the statistic similarity index indicative of the statistic similarity between blocks P and Q, $\mu(P)$ is a block sample mean of the block P, $\mu(Q)$ is a block sample mean of the block Q, Var(P) is a block sample variance of the block P, Var(Q) is a block sample variance of the block Q, Cov(P, Q) is a covariance between blocks P and Q, and $\alpha$ and $\beta$ are weighting factors; and
   filling the empty pixel position with the specific pixel surrounded by the best matching block on the first or second reference picture.

8. A computer-based system for visual signal extrapolation or interpolation, comprising:
   means for obtaining and storing at least a first and a second reference picture;
   means for conducting motion estimation on the first and second reference picture to generate motion vectors indicative of movement of at least one of the first and second reference picture in relation to the other;
   means for generating an estimate picture by extrapolation or interpolation from the first or the second reference picture using the motion vectors;
   means for determining existence of multiple pixel mappings to a specific pixel position in said estimate picture; and
   means for refining the estimate picture with said specific pixel having said multiple pixel mappings,
   said refining means configured to perform a statistic similarity estimation in refining the estimate picture by:
   calculating statistic features for a neighboring block that surrounds the specific pixel position on the estimate picture;
   calculating statistic features for multiple blocks of pixels that each surrounds one of the multiple pixels on the reference picture;
   identifying the best matching block among the multiple blocks surrounding the multiple pixels on the reference picture, wherein the best matching block has the highest statistic similarity to the neighboring block that surrounds the specific pixel position on the estimate picture according to a statistical similarity index computed by:

$$SSI(P,Q) = \frac{\alpha}{\sqrt{[Cov(P,Q)^2 - Var(P) \times Var(Q)]^2 + \beta[\mu(P) - \mu(Q)]^2}},$$

wherein P is the neighboring block that surrounds the specific pixel position on the estimate picture, Q is one of the multiple blocks that surround the multiple pixels on the reference picture, SSI(P, Q) is the statistic similarity index indicative of the statistic similarity between blocks P and Q, $\mu(P)$ is a block sample mean of the block P, $\mu(Q)$ is a block sample mean of the block Q, Var(P) is a block sample variance of the block P, Var(Q) is a block sample variance of the block Q, Cov(P, Q) is a covariance between blocks P and Q, and $\alpha$ and $\beta$ are weighting factors; and
   selecting the pixel that is surrounded by the best matching block on the reference picture as the best matching pixel for the specific pixel position on the estimate picture.

\* \* \* \* \*